United States Patent
Mishra et al.

(10) Patent No.: US 12,452,708 B2
(45) Date of Patent: Oct. 21, 2025

(54) METHOD AND APPARATUS FOR SESSION AUDIT FOR CONTROL AND USER PLANE SEPARATION

(71) Applicant: Mavenir Systems, Inc., Richardson, TX (US)

(72) Inventors: Abhishek Mishra, Bangalore (IN); Vipin Padlikar, Bangalore (IN); Rohit Gupta, Bangalore (IN); Tamanna Jindal, McKinney, TX (US)

(73) Assignee: Mavenir Systems, Inc., Richardson, TX (US)

( * ) Notice: Subject to any disclaimer, the term of this patent is extended or adjusted under 35 U.S.C. 154(b) by 561 days.

(21) Appl. No.: 17/890,330

(22) Filed: Aug. 18, 2022

(65) Prior Publication Data

US 2023/0062904 A1     Mar. 2, 2023

(30) Foreign Application Priority Data

Aug. 24, 2021   (IN) .............................. 202121038337

(51) Int. Cl.
*H04W 24/08* (2009.01)
*H04W 76/11* (2018.01)

(52) U.S. Cl.
CPC ............ *H04W 24/08* (2013.01); *H04W 76/11* (2018.02)

(58) Field of Classification Search
CPC ...... H04W 24/08; H04W 24/04; H04W 76/11
See application file for complete search history.

(56) References Cited

U.S. PATENT DOCUMENTS 12,231,393 B2 *   2/2025   He ..................... H04L 61/5007
2021/0058826 A1 *  2/2021   Mao .................. H04W 28/0933
(Continued)

FOREIGN PATENT DOCUMENTS

EP      4027684 A1 *   7/2022   ............ H04W 40/20
EP      4072234 A1 *  10/2022   ............ H04W 76/14
(Continued)

OTHER PUBLICATIONS

Extended European Search Report for corresponding European application EP22191740.4, 8 pages, dated Jan. 16, 2023.
(Continued)

*Primary Examiner* — Sujoy K Kundu
*Assistant Examiner* — Vladislav Y Agureyev
(74) *Attorney, Agent, or Firm* — Ruggiero McAllister & McMahon LLC

(57) ABSTRACT

There is provided a method for a session audit in a communication system having a first plane and a second plane. The method can be employed in a case in which the first plane is a control plane and the second plane is a user plane, or a case in which the first plane is a user plane and the second plane is a control plane. The first plane performs operations of (1) sending to the second plane, an association update request that contains a first vendor-specific information element (IE) having (a) a bit set to indicate a desire for a single control plane (CP) fully-qualified session identification (CP F-SEID), and (b) a CP F-SEID, and (2) receiving from the second plane, an association update response that contains a second vendor-specific IE having (a) the CP F-SEID, and (b) a mapped user plane (UP) fully-qualified session identification (UP F-SEID).

16 Claims, 3 Drawing Sheets

CUPS Architecture

(56) References Cited

U.S. PATENT DOCUMENTS

| | | | | |
|---|---|---|---|---|
| 2021/0352536 A1* | 11/2021 | Prabhakar | ............ | H04L 43/0852 |
| 2022/0330122 A1* | 10/2022 | Srivastava | ......... | H04W 28/0268 |
| 2022/0353336 A1* | 11/2022 | Cañete Martinez | .... | H04L 41/50 |
| 2023/0029167 A1* | 1/2023 | Neelakantamurthy | ...................... | H04W 12/72 |
| 2023/0247524 A1* | 8/2023 | Lu | ......................... | H04W 76/22 370/331 |

FOREIGN PATENT DOCUMENTS

| | | | | |
|---|---|---|---|---|
| EP | 4164148 A1 * | 4/2023 | ............. | H04L 45/42 |
| EP | 4340322 A2 * | 3/2024 | ............ | H04L 12/413 |

OTHER PUBLICATIONS

ETSI TS 129 244 v. 16.8.0 "LTE; 5G; Interface Between the Control Plane and the User Plan Nodes" 3rd Generation Partnership Project TS.29.244 v. 16.8.0 Release 16; Aug. 2021; Cedex, France.

3GPP TS 23.501 v. 16.2.0 3rd Generation Partnership Project; Technical Specification Group Services and System Aspects; System Architecture for the 5G System (5GS); Stage 2 (Release 16); 3rd Generation Partnership Project; Sep. 2019.

3GPP TS 23.502 v. 16.2.0 3rd Generation Partnership Project; Technical Specification Group Services and System Aspects; Procedures for the 5G System (5GS); Stage 2 (Release 16); 3rd Generation Partnership Project; Sep. 2019

3GPP TS 29.244 v. 16.3.0 3rd Generation Partnership Project; Technical Specification Group Core Network and Terminals; Interface Between the Control Plane and User Plane Nodes; Stage 3 (Release 16); 3rd Generation Partnership Project; Mar. 2020.

Rekhter et al. "A Border Gateway Protocol 4 (BGP-4)" The Internet Society, Jan. 2006.

3GPP TS 29.561 v. 16.3.0 3rd Generation Partnership Project; Technical Specification Group Core Network and Terminals; 5G System; Interworking Between 5G Network and External Data Networks; Stage 3 (Release 16); 3rd Generation Partnership Project; Mar. 2020.

* cited by examiner

CUPS Architecture

UP querying the CP for the existing sessions at the CP

METHOD AND APPARATUS FOR SESSION AUDIT FOR CONTROL AND USER PLANE SEPARATION

BACKGROUND OF THE DISCLOSURE

1. Field of the Disclosure

The present disclosure relates to communication systems that include a control plane and a user plane, and more particularly, to a technique for performing a session audit in such a communication system.

2. Description of the Related Art

The approaches described in this section are approaches that could be pursued, but not necessarily approaches that have been previously conceived or pursued. Therefore, the approaches described in this section may not be prior art to the claims in this application and are not admitted to be prior art by inclusion in this section.

Near the end of the present document, there is a section that includes definitions of acronyms.

A plane is a component in communication that is used to carry data or user traffic, control traffic or management traffic. A user plane (UP) is defined to carry the data or user traffic (e.g., in case of a user equipment (UE) browsing an online video, the payloads that form the video are the user data). A control plane (CP) is defined to carry control traffic (e.g., in case of a UE wanting to browse an online video, the initial/intermediate messages required to carry the setup between the UE and the online video, so that the UE can do the browsing). A management plane is defined to carry management specific signaling, that can monitor a specific Network Equipment and its functions (e.g., in case of a network administrator, wanting to do the status check on a given Network Equipment shall send initial/intermediate messages to the Network Equipment required to carry the setup between his device and the network equipment. Along with this, the network administrator shall be able to collect the statistics required for the status check from the network equipment).

3GPP has defined separate UP functions, e.g., PGW-U or UPF, that carry user traffic from CP functions, e.g., PGW-C or SMF that carry the signaling traffic to allow scalability of individual control and user plane nodes, allow flexible deployments where there can be a control plane situated in a centralized location and user plane situated in a distributed (remote) location or vice versa. Keeping the above postulates as base, the gateways are decomposed into CP and UP functionalities.

A session is context that is created when the CP controls the packet processing in the UP by installing rules for packet processing.

The CP function performs a selection of its respective UP function considering parameters of a PDU (Packet Data Unit) or PDN (Packet Data Network) session, i.e., a session that UE is starting for a given service such as internet. The parameters are UE's location information, features, and capacity of the UP function and services that are needed at the UE. Other than the above, the selection of UP function also takes the UP function deployment scenarios as whether the UP is centrally located or distributed UP are located close the access, e.g., radio. Operator defined parameters like a given UP supporting a subset of optional functionalities like software version of the UP are also taken into consideration while selection.

A control "session" is the term referred, which a CP creates with a UP for signaling the establishment of a data path/connection. A data "connection" is the term used for a path that data packets of User Equipment (UE) take to traverse.

The Control Plane (CP) (PGW-C or SMF) can request the User Plane (UP)(PGW-U or UPF) to create a PDU (Packet Data Unit) or PDN (Packet Data Network) connection. This request contains the control session ID for which the PDU/PDN connection is established. Each PDU/PDN connection corresponds to a control session ID (commonly known as CP F-SEID (Control Plane Fully-qualified Session Identification)). PFCP protocol is used between CP and UP that runs over a UDP transport. The CP F-SEID is provided in a PFCP Session Establishment Request to the UP.

During a real-time scenario, it is possible that the PDU/PDN connections opened at the UP are no longer existing due to an HA or interface restart of which the CP is not informed. Also, it may be possible that during the HA or interface restart of the CP, the UP is not aware of currently active control, e.g., PFCP, sessions. Such sessions or connections for which one of CP or UP is not aware, but is existing in the system, are termed as "Zombie". Zombies are processor-consuming, and also hamper the performance of the overall system.

The present document discloses a technique in which the CP and UP perform session audits that assist zombie session management.

SUMMARY OF THE DISCLOSURE

The present document discloses a method for a session audit in a communication system having a first plane and a second plane. The method can be employed in a case in which the first plane is a control plane and the second plane is a user plane, or a case in which the first plane is a user plane and the second plane is a control plane.

In a first aspect of the method, the first plane performs operations of (1) sending to the second plane, an association update request that contains a first vendor-specific information element (IE) having (a) a bit set to indicate a desire for a single control plane (CP) fully-qualified session identification (CP F-SEID), and (b) a CP F-SEID, and (2) receiving from the second plane, an association update response that contains a second vendor-specific IE having (a) the CP F-SEID, and (b) a mapped user plane (UP) fully-qualified session identification (UP F-SEID). Conversely, the second plane performs operations of receiving the association update request, and sending the association update response.

In a second aspect of the method, the first plane performs operations of (1) sending to the second plane, an association update request that contains a first vendor-specific information element (IE) having a bit set to indicate a desire for all control plane (CP) fully-qualified session identifications (CP F-SEIDs) available at the second plane, and (2) receiving from the second plane, an association update response that contains multiple second vendor-specific IEs, each having (a) a CP F-SEID, and (b) a mapped user plane (UP) fully-qualified session identification (UP F-SEID) available at the second plane. Conversely, the second plane performs operations of receiving the association update request, and sending the association update response.

BRIEF DESCRIPTION OF THE DRAWINGS

A component or a feature that is common to more than one drawing is indicated with the same reference number in each of the drawings.

DESCRIPTION OF THE DISCLOSURE

Figure 1:
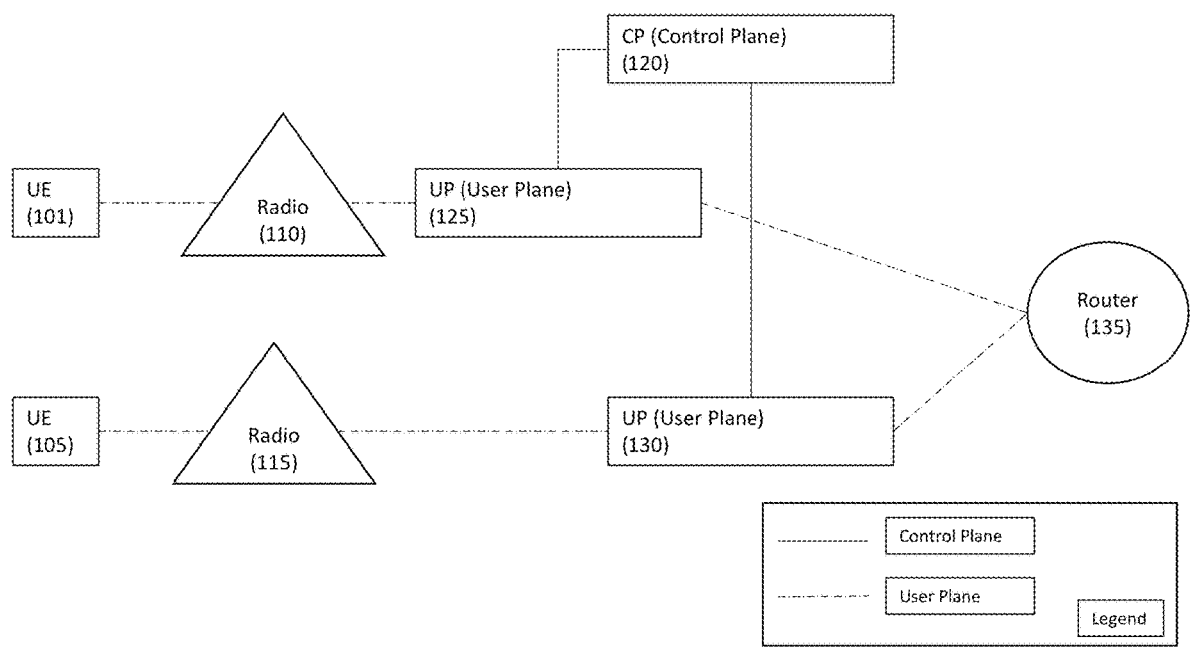
FIG. 1 is a block diagram of a communication system that includes CP and UP interworking.

FIG. 1 is a block diagram of a communication system, namely system 100, that includes CP and UP interworking. UE 101 is connected, via a radio 110, to a UP 125. UE 105 is connected, via a radio 115, to UP 130. UP 125 and UP 130 are connected to a CP 120, and to a router 135.

During regular operation of CP 120 and UPs 125 and 130, in a case of multiple control sessions, CP 120 or UPs 125 and 130 are not aware which of the sessions are existing or zombie. Without a regular mechanism of audit, CP 120 or UPs 125 and 130 will never be made aware of the sessions that are active or have become zombie.

A session audit is a set of rules installed by the CP on the peer UP or vice versa for auditing (i.e., deriving the existence and validity of) the session on that peer.

Each of CP 120, UP 125 and UP 130 is an apparatus that includes electronic circuitry that performs operations to execute methods or processes described herein. The circuitry may be implemented with any or all of (a) discrete electronic components, (b) firmware, or (c) a programmable circuit that includes a processor and a memory. Such a processor is an electronic device configured of logic circuitry that responds to and executes instructions. Such a memory is a tangible, non-transitory, computer-readable storage device encoded with a computer program. In this regard, the memory stores data and instructions, i.e., program code, that are readable and executable by the processor for controlling operations of the processor. The memory may be implemented in a random-access memory (RAM), a hard drive, a read only memory (ROM), or a combination thereof.

Such a processor and memory may be implemented in a computer. The computer can be a standalone device or coupled to other devices in a distributed processing system.

Additionally, the program code may be configured on a storage device for subsequent loading into the memory. Such a storage device is a tangible, non-transitory, computer-readable storage device, and examples include (a) a compact disk, (b) a magnetic tape, (c) a read only memory, (d) an optical storage medium, (e) a hard drive, (f) a memory unit consisting of multiple parallel hard drives, (g) a universal serial bus (USB) flash drive, (h) a random-access memory, and (i) an electronic storage device coupled the components of system 100 via a data communication network.

Figure 2:
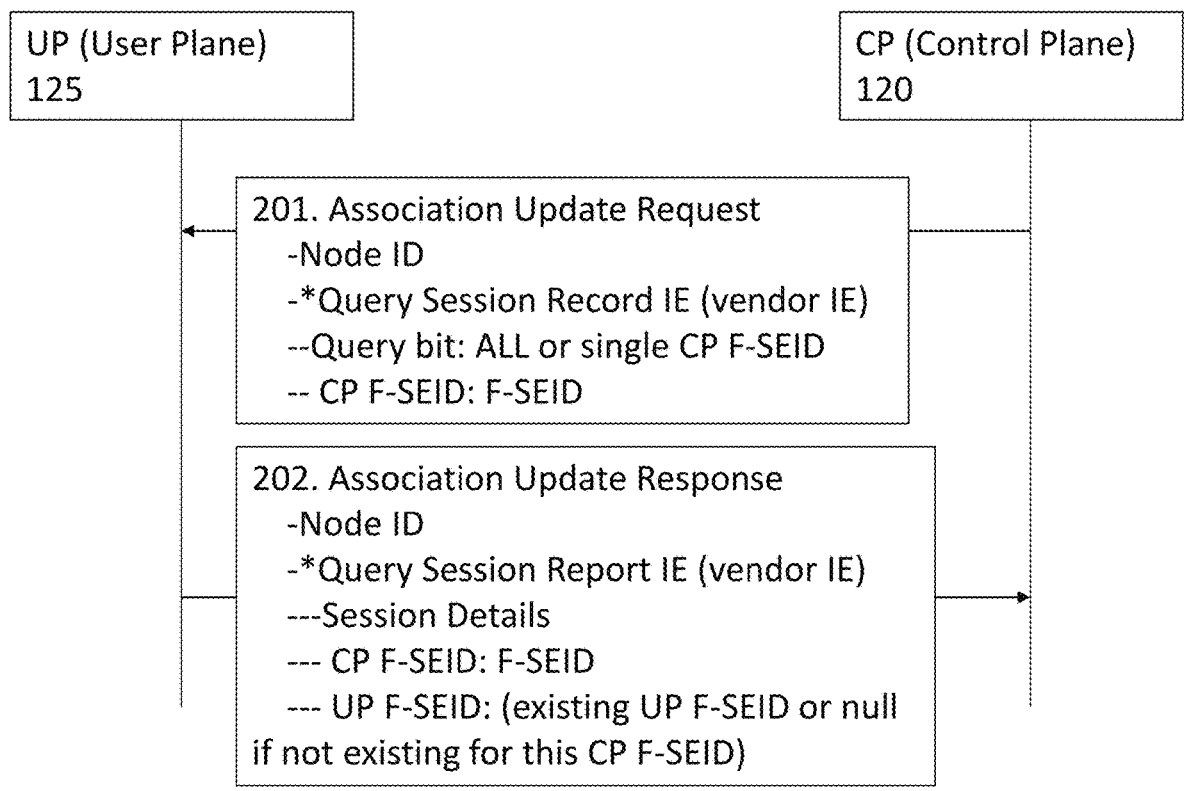
FIG. 2 shows an exchange of messages between a UP and a CP in the communication system of FIG. 1, in which the CP queries the UP for the existing sessions at the UP.

The program code may be configured in one or more modules. The term "module" is used herein to denote a functional operation that may be embodied either as a stand-alone component or as an integrated configuration of a plurality of subordinate components. Thus, a module may be implemented as a single module or as a plurality of sub-ordinate modules that operate in cooperation with one another.
Problem Statement
 (A) The sessions are created at regular intervals. However, during the HA of the NF (CP or UP) or during the interface reset, the sessions may be terminated. However, the same information about the termination may not be communicated to the peer NF (UP or CP).
 (B) Audit is a time-consuming procedure as it requires large amount of data to be sent across. This may hamper the further processing of new sessions.
Solution
 For the solution, the following shall be done:
 (A) The following procedures are defined:
  a. CP or UP will send a PFCP Association Update Request containing a vendor-specific IE (Query Session Record IE) with the CP F-SEID. Multiple IE(s) are sent if there is more than one CP F-SEID to be queried. ALL keyword can be additionally used.
  b. The peer node (UP or CP) shall send a PFCP Association Update Response containing a vendor-specific IE (Query Session Report IE) with the CP F-SEID and mapped UP F-SEID. "Mapped" UP F-SEID are the F-SEID of the UP, which have context available with the CP F-SEID requested in the PFCP message. If no UP F-SEID exists for this CP F-SEID, then UP F-SEID is not sent in the IE.
  c. Multiple Query Session Response IE(s) are sent if there is more than one CP F-SEID queried.
  d. F-SEID for which the session does not exist, the node (CP or UP) will clear the sessions.
 (i) CP Performing Audit FIG. 2 shows an exchange of messages between UP 125 and CP 120, in which CP 120 queries UP 125 for the existing sessions at UP 125.

Operation 201. CP 120 sends to UP 125 the Association Update Request message containing the Query Session Record IE. The IE contains the Query Bit and optionally CP F-SEID IE for which the audit is to be done. Multiple Query Session Record IE is possible in a message if there is a request to query more than one CP SEID. The Query bit set to 1 shall indicate that all the CP F-SEID existing at the peer NF are to be audited. In this case the Query Session Record IE will not contain the CP F-SEID IE.

Operation 202. UP 125 sends to CP 120 the Association Update Response message containing the Query Session Report IE. The IE contains the mapping of CP F-SEID IE with the UP F-SEID IE that exists for the session. If no UP F-SEID exists for the CP F-SEID, then the UP F-SEID is not sent.

Figure 3:
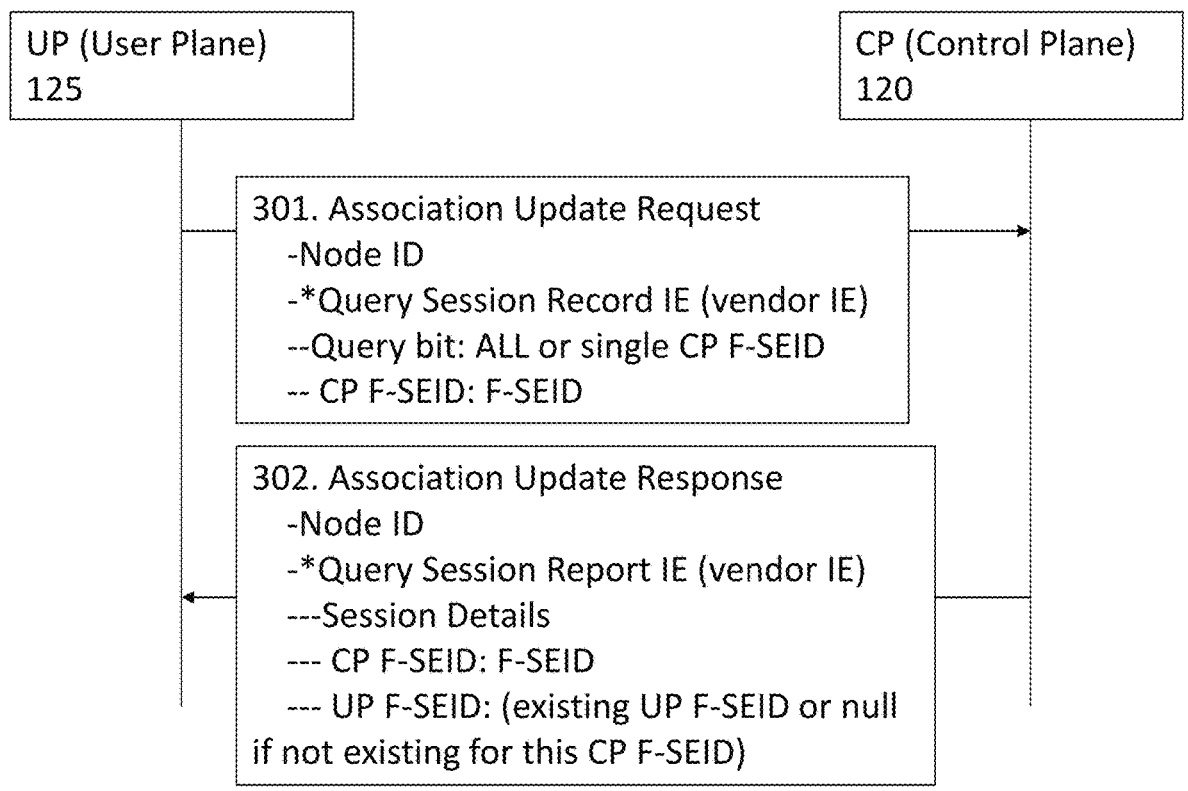
FIG. 3 shows an exchange of messages between a UP and a CP in the communication system of FIG. 1, in which the UP queries the CP for the existing sessions at the CP.

Local cleanup at the NF (UP 125 or CP 120) will be done for sessions which do not have UP F-SEID available.
 (ii) UP Performing Audit FIG. 3 shows an exchange of messages between UP 125 and CP 120, in which UP 125 queries CP 120 for the existing sessions at CP 120.

Operation 301. UP 125 sends to CP 120 the Association Update Request message containing the Query Session Record IE. The IE contains the Query Bit and optionally CP F-SEID IE for which the audit is to be done. Multiple Query Session Record IE is possible in a message if there is a request to query more than one CP SEID. The Query bit set to 1 shall indicate that all the CP F-SEID existing at the peer NF are to be audited. In this case the Query Session Record IE will not contain the CP F-SEID IE.

Operation 302. CP 120 sends the Association Update Response message to UP 125 containing the Query Session Report IE. The IE contains the mapping of CP F-SEID IE with the UP F-SEID IE that exists for the session. If no UP F-SEID exists for the CP F-SEID, then the UP F-SEID is not sent.

Local cleanup at the NF (UP 125 or CP 120) will be done for sessions which do not have UP F-SEID available.

(iii) IE Details
1. Query Session Record IE shall be detailed as below:
   (i) Query All Bit if it is set, then CP F-SEID shall not be provided.
   (ii) Query All Bit if it is not set, then CP F-SEID shall be provided.
   (iii) CP F-SEID shall be the CP side Session ID.
2. Query Session Report IE shall be detailed as below:
   (i) CPFSEID Bit if it is set, then CP F-SEID shall be provided.
   (ii) UPFSEID Bit if it is set, then UP F-SEID shall be provided.

(B) At the NF (UP 125 or CP 120) there shall be time and space configuration provided to send the Audit IEs (Query Session Report IE) in different messages after sending the first Association Setup Response, if the number of Audit IEs are large in number and cannot be accommodated in a single Response message.

a. In order to do so, the Query Session Report IE shall include a sequence identifier to identify this IE in the Association Setup response. It shall set a flag, "more IE to follow".

b. The remaining IE shall be injected in any new message (s) that NF is sending, provided the message has the space to carry it.

c. The last "Query Session Response IE" shall unset the flag "more IE to follow" bit.

3GPP, while recommending the CP and UP separation, does not recommend any procedures for audit of the PDU/PDN sessions existing on the UP or CP. This creates an issue on the NF where a number of sessions are created or released at any given time, but the other functionality does not know about the actual status of the existing session. This can happen due to network packet losses, loss of messages, or internal malfunction of the NF that results in non-update of the contexts where the session information is stored.

System 100 addresses the problem of mismatch of the existing sessions, where audit of a session existing in peer functionality is performed without impacting the 3GPP defined procedures. The audit helps in releasing the sessions that are not existing in the system, or in re-creating them if needed.

With UP and CP separation, the session loss is a common observation, and in absence of 3GPP defined procedure, it is difficult to audit the sessions. System 100 executes a process to audit the sessions.

If the number of sessions is too large, then system 100 sends the audited structures in different messages.

The solution disclosed herein is applicable for 5G, 4G and GPRS networks.
  (a) In a 5G network, the CP is SMF and the UP is UPF.
  (b) In a 4G network, the CP is a PGW-C, TDF-C or SGW-C, and the UP is PGW-U, TDF-U or SGW-U respectively.
  (c) In a GPRS network, the CP is GGSN-C and the UP is a GGSN-U.

In the above-mentioned operations, the CP or UP executes the procedures for the audit in accordance with the solution disclosed herein.

Thus, there is provided a method for a session audit in a communication system having a first plane and a second plane. The method can be employed in a case in which the first plane is a control plane, e.g., CP 120, and the second plane is a user plane, e.g., UP 125, or a case in which the first plane is a user plane, e.g., UP 125, and the second plane is a control plane, e.g., CP 120.

In a first aspect of the method, the first plane performs operations of (1) sending to the second plane, an association update request that contains a first vendor-specific information element (IE) having (a) a bit set to indicate a desire for a single control plane (CP) fully-qualified session identification (CP F-SEID), and (b) a CP F-SEID, and (2) receiving from the second plane, an association update response that contains a second vendor-specific IE having (a) the CP F-SEID, and (b) a mapped user plane (UP) fully-qualified session identification (UP F-SEID). Conversely, the second plane performs operations of receiving the association update request, and sending the association update response.

In a second aspect of the method, the first plane performs operations of (1) sending to the second plane, an association update request that contains a first vendor-specific information element (IE) having a bit set to indicate a desire for all control plane (CP) fully-qualified session identifications (CP F-SEIDs) available at the second plane, and (2) receiving from the second plane, an association update response that contains multiple second vendor-specific IEs, each having (a) a CP F-SEID, and (b) a mapped user plane (UP) fully-qualified session identification (UP F-SEID) available at the second plane. Conversely, the second plane performs operations of receiving the association update request, and sending the association update response.

The first plane may perform a further operation of sending to the second plane, a subsequent message that includes a query session record IE.

The first plane may perform a further operation of receiving from the second plane, a subsequent message that includes a query session report IE.

The CP F-SEID is a CP-generated fully-qualified session ID, and the UP F-SEID is a UP-generated fully-qualified session ID sent by the second plane within a query session report IE in a packet forwarding control protocol (PFCP) message for a requested CP F-SEID in a query session record IE.

The implementation described herein is exemplary and should not be construed as implying any particular limitation on the present disclosure. It should be understood that various alternatives, combinations and modifications could be devised by those skilled in the art. For example, operations associated with the processes described herein can be performed in any order, unless otherwise specified or dictated by the operations themselves. The present disclosure is intended to embrace all such alternatives, modifications and variances that fall within the scope of the appended claims.

Acronyms
  3GPP 3$^{rd}$ Generation Partnership Project
  4G 4$^{th}$ Generation
  5G 5$^{th}$ Generation
  5GC 5G Core Network
  5GS 5G System
  ALL A value in query bit of query session record IE to instruct the NF to send all available mapping of CP F-SEID to UP F-SEID available with it.
  CP Control Plane
  CP F-SEID Control Plane Fully-qualified Session Identification
  DL Downlink
  GGSN-C Gateway GPRS Support Node-Control
  GGSN-U Gateway GPRS Support Node-User
  GPRS General Packet Radio Services
  HA High Availability
  ID Identification
  IE Information Element
  NF Network Function PDN Packet Data Network
PDU Packet Data Unit
PFCP Packet Forwarding Control Protocol
PGW-C Packet Gate Way (Control)
PGW-U Packet Gate Way (User)
SGW-U Signaling Gateway-User
SMF Session Management Function
TDF-C Traffic Detection Function-Control
TDF-U Traffic Detection Function-User
UDP User Datagram Protocol
UE User Equipment
UL Uplink
UP User Plane
UPF User Plane Function
UP F-SEID User Plane Fully-qualified Session Identification The terms "comprises" or "comprising" are to be interpreted as specifying the presence of the stated features, integers, operations or components, but not precluding the presence of one or more other features, integers, operations or components or groups thereof. The terms "a" and "an" are indefinite articles, and as such, do not preclude embodiments having pluralities of articles.

What is claimed is:

1. A method for a session audit in a communication system having a first plane and a second plane, wherein said method comprises said first plane performing operations of:
   sending to said second plane, an association update request message that contains a first vendor-specific information element (IE) having (a) a bit set to indicate a desire for a single control plane (CP) fully-qualified session identification (CP F-SEID), and (b) a CP F-SEID for which an audit is to be done; and
   receiving from said second plane, an association update response message that contains a second vendor-specific IE having (a) said CP F-SEID, and (b) a mapped user plane (UP) fully-qualified session identification (UP F-SEID).

2. The method of claim 1, further comprising:
   sending to said second plane, a subsequent message that includes a query session record IE.

3. The method of claim 1, further comprising:
   receiving from said second plane, a subsequent message that includes a query session report IE.

4. The method of claim 1,
   wherein said CP F-SEID is a CP-generated fully-qualified session ID, and
   wherein said UP F-SEID is an UP-generated fully-qualified session ID sent by said second plane within a query session report IE in a packet forwarding control protocol (PFCP) message for a requested CP F-SEID in a query session record IE.

5. The method of claim 1, wherein said first plane is a control plane and said second plane is a user plane.

6. The method of claim 1, wherein said first plane is a user plane and said second plane is a control plane.

7. An apparatus comprising:
   electronic circuitry adapted to perform the operations of the method of claim 1.

8. A non-transitory storage device, comprising:
   instructions that are readable by a processor to cause said processor to perform the operations of the method of claim 1.

9. A method for a session audit in a communication system having a first plane and a second plane, wherein said method comprises said first plane performing operations of:
   sending to said second plane, an association update request message that contains a first vendor-specific information element (IE) having a bit set to indicate a desire for carrying out an audit for all control plane (CP) fully-qualified session identifications (CP F-SEIDs) available at said second plane; and
   receiving from said second plane, an association update response message that contains multiple second vendor-specific IEs, each having (a) a CP F-SEID, and (b) a mapped user plane (UP) fully-qualified session identification (UP F-SEID) available at said second plane.

10. The method of claim 9, further comprising:
    sending to said second plane, a subsequent message that includes a query session record IE.

11. The method of claim 9, further comprising:
    receiving from said second plane, a subsequent message that includes a query session report IE.

12. The method of claim 9,
    wherein each said CP F-SEID is a CP-generated fully-qualified session ID, and
    wherein each said UP F-SEID is an UP-generated fully-qualified session ID sent by said second plane within a query session report IE in a packet forwarding control protocol (PFCP) message in a query session record IE available at said second plane.

13. The method of claim 9, wherein said first plane is a control plane and said second plane is a user plane.

14. The method of claim 9, wherein said first plane is a user plane and said second plane is a control plane.

15. An apparatus comprising:
    electronic circuitry adapted to perform the operations of the method of claim 9.

16. A non-transitory storage device, comprising:
    instructions that are readable by a processor to cause said processor to perform the operations of the method of claim 9.

* * * * *